United States Patent [19]
Bell

[11] 3,753,733

[45] Aug. 21, 1973

[54] METHOD OF PREPARING A COMPOSITE PIE

[76] Inventor: Carl F. Bell, P.O. Box 145 East Aurora, N.Y. 14052

[22] Filed: June 21, 1971

[21] Appl. No.: 155,124

[52] U.S. Cl. .................................... 99/92, 99/86
[51] Int. Cl. .................................... A21d 13/08
[58] Field of Search .................................... 99/86, 92

[56] References Cited
UNITED STATES PATENTS
R19,153   5/1934   Battista .................................... 99/92

OTHER PUBLICATIONS
Strause, "Pie Marches On", Ahrens Book Co. Inc., N.Y., 1966, pages 69–71, 74, 75 278–280

Primary Examiner—Raymond N. Jones
Attorney—Conrad Christel and Edwin T. Bean, Jr.

[57] ABSTRACT

A method of making a composite pie comprising a plurality of separate and differently flavored layers of filling enveloped within a shell of crust. A divider of crust is interposed between adjacent layers of fillings for separating and isolating such layers from each other.

2 Claims, 5 Drawing Figures

PATENTED AUG 21 1973

3,753,733

INVENTOR.
Carl F. Bell
BY Christel + Bean
ATTORNEYS.

METHOD OF PREPARING A COMPOSITE PIE

BACKGROUND OF THE INVENTION

This invention relates generally to a pastry product and, more particularly, to a novel composite pie and the method of making the same.

The conventional pie consists of a fruit or other suitable edible filling baked and completely enveloped in an enclosure or shell of crust. While the particular filling may consist of a mixture of various food constituents, it is formed in a single, unitary mass so that the constituents are blended together.

SUMMARY OF THE INVENTION

Accordingly, it is an object of the present invention to provide a composite pie having a plurality of differently flavored layers of fillings within a shell of crust.

It is another object of this invention to provide the foregoing pie with edible means for separating and isolating the various flavored layers of fillings within the shell of crust.

It is a further object of the present invention to provide a method for making a composite pie having differently flavored layers of fillings separated from each other within a shell of crust.

In one aspect thereof, the composite pie of the present invention is characterized by the provision of separate and differently flavored layers of fillings contained within the crust of the pie. A divider of crust is interposed between adjacent layers of fillings to separate and isolate such layers from each other.

The foregoing and other objects, advantages and characterizing features of the present invention will become clearly apparent from the ensuing detailed description of an illustrative embodiment thereof, taken together with the accompanying drawing wherein like reference numerals denote like parts throughout the various views.

BRIEF DESCRIPTION OF THE DRAWING FIGURES

DETAILED DESCRIPTION OF AN ILLUSTRATIVE EMBODIMENT

Figure 1:
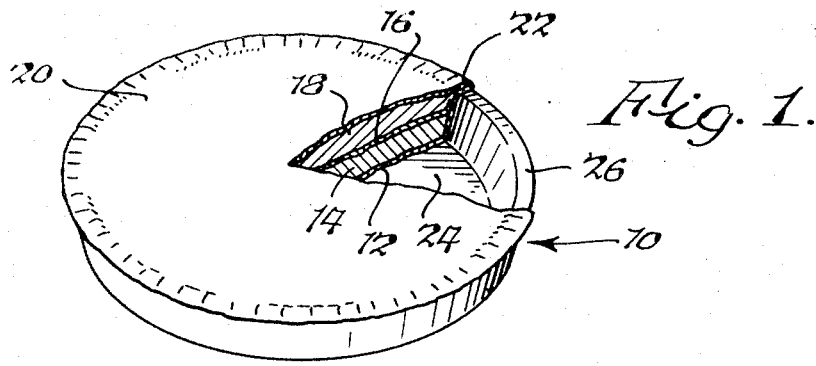
FIG. 1 is a perspective view of one form of a composite pie of the present invention, showing a section removed to more clearly illustrate the invention.
Figure 5:
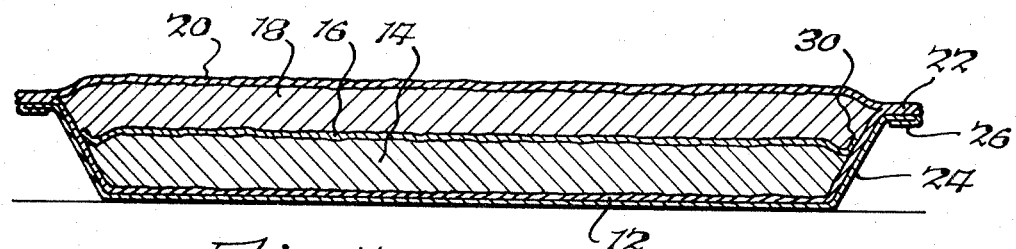
FIG. 5 is a view similar to FIG. 4, illustrating the finished composite pie after the baking operation.

Referring now in detail to the drawings, there is shown in FIG. 1 a baked pastry product in the form of a pie, generally designated 10, having a triangular section removed therefrom to illustrate the interior thereof. As shown in FIGS. 1 and 5, pie 10 comprises an inner or bottom layer of crust 12, a lower layer of pastry filling 14, an intermediate layer or partition of crust 16, an upper layer of pastry filling 18, and an outer layer or covering of crust 20 sealed along the marginal edges thereof to said inner liner of crust 12 as at 22. The inner and outer layers of crust, 12 and 20, respectively, form an edible shell containing the two differently flavored layers of filling. Pie 10 is a self sustained unit and can be readily handled similarly to the conventional pie. Fillings 14 and 18 preferably are compatible or complementary-flavored fruit fillings but can be any desired pastry fillings, such as custards, puddings and the like or any desired edibles, such as meat and poultry products. Also, while only two layers of pastry fillings are shown in the illustrative embodiment, it should be understood that more than two such layers are contemplated within the purview of this invention.

Figure 2:
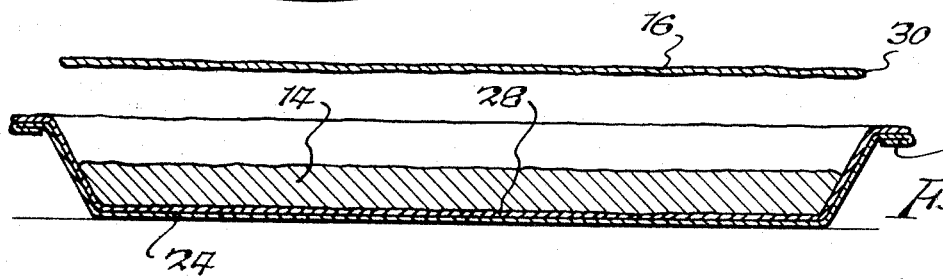
FIG. 2 is a vertical sectional view, on an enlarged scale, illustrating a step of the method for making the composite pie of this invention.
Figure 3:
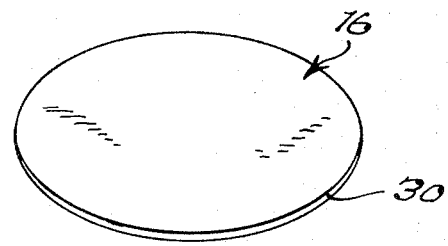
FIG. 3 is a perspective view of a crust divider used in conjunction with this invention.
Figure 4:
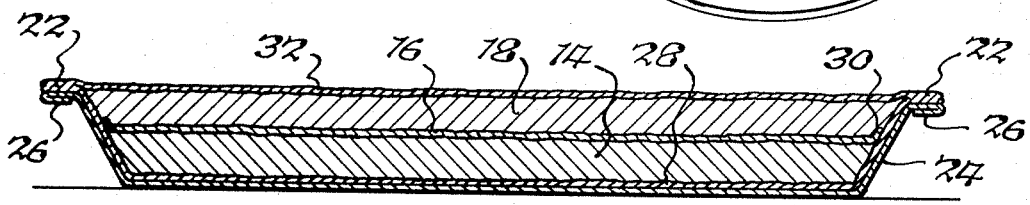
FIG. 4 is a vertical sectional view, on an enlarged scale, illustrating the composite pie of this invention prior to the baking operation.

In making the composite, multi-layered pie of this invention, a standard pie tin or baking dish 24, having an annular flange 26, is lined with a raw dough mixture 28 to conform to the shape of dish 24, as shown in FIG. 2, to ultimately form the crust liner 12. A selected fruit, or any other pastry filling 14, is poured on the bottom of the raw dough mixture liner 28 up to a level approximately one-half the depth of dish 24, as shown in FIG. 2.

A thin disc or divider 16, formed of pre-baked crust and having a peripheral edge 30 generally conforming in plan to the inner wall surface of dish 24, is placed on the layer of filling 14. A second selected pastry filling 18 is poured on crust divider 16 and covered by a relatively thin covering of raw dough mixture 32, which is sealed along its marginal edges to the inner liner or layer of raw dough 28. Divider 16 can be slightly larger in diameter than the inside diameter of dish 24 at the area approximately midway of the latter to insure complete peripheral contact of edge 30 with the inner wall surface of dish 24. This prevents leakage of filling 18 into the filling 14, thus maintaining the separate layers isolated and preserving their original characteristics and properties.

The composite assembly is then placed in an oven and baked under predetermined thermal conditions. During baking, fillings 14 and 18 serve as heat insulators preventing further baking of the intermediate crust divider 16 and maintaining the latter in its original baked condition while the inner layer of dough 28 and the covering of dough 32 bake to a desired texture forming the inner and outer crusts 12 and 20, respectively, of pie 10. During baking, the entire edible assembly expands causing dough liner 28 and dough covering 32 to expand to the thickness of crust divider 16, the dimensions of which remain substantially intact.

The finished edible product yields a single, unitary pie having an enclosure of crust containing two separate but complementary flavored fillings separated and isolated by an intermediate layer of crust. When removing a section of the finished pie, the multi-colored appearance of the different layers of filling creates an appetizing and attractive impression. If desired, a suitable topping, such as whipped cream or a meringue, can be placed on outer crust 20.

While only two layers of pastry fillings are incorporated in the illustrative embodiment, it should be understood that more than two layers can be provided, if desired, with adjacent layers being separated by crust dividers 16. Also, the shape of pie 10 in plan can vary, as desired, it being understood that the shape of crust divider 16 will be shaped in conformity to the shape of pie dish 24.

From the foregoing, it is apparent that the present invention fully accomplishes its intended objects and provides a novel composite pie and the method of making it. A preferred embodiment of this invention having been disclosed in detail, it is to be understood that this has been done by way of illustration only.

I claim:

1. A method of forming a composite pie comprising: lining a baking dish with a layer of a raw dough mixture, pouring a first filling on said layer of raw dough up to a predetermined level, placing an edible divider in the form of a pre-baked disc of crust on said first filling, pouring a second filling on said divider, placing a covering of raw dough on said second filling and sealing the marginal edge thereof to the marginal edge of said layer of raw dough to form a pie shell, said divider having a peripheral edge in contact with said pie shell to insure separation between said first and second fillings and baking said assembly under controlled temperatures whereby said first and second fillings serve as heat insulators preventing further baking of the intermediate crust divider and maintaining the latter in its original baked condition.

2. A method according to claim 1 wherein said layers of filling are differently flavored from each other.

* * * * *